US011566566B2

(12) United States Patent
Abe et al.

(10) Patent No.: US 11,566,566 B2
(45) Date of Patent: Jan. 31, 2023

(54) AIRCRAFT ENGINE POWER GENERATOR DISPOSED INSIDE OF A STATIONARY NOSE CONE

(71) Applicant: KAWASAKI JUKOGYO KABUSHIKI KAISHA, Kobe (JP)

(72) Inventors: Akihito Abe, Kobe (JP); Tatsuhiko Goi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 322 days.

(21) Appl. No.: 15/539,236

(22) PCT Filed: Nov. 4, 2015

(86) PCT No.: PCT/JP2015/005529
§ 371 (c)(1),
(2) Date: Jun. 23, 2017

(87) PCT Pub. No.: WO2016/103551
PCT Pub. Date: Jun. 30, 2016

(65) Prior Publication Data
US 2018/0016989 A1    Jan. 18, 2018

(30) Foreign Application Priority Data
Dec. 24, 2014  (JP) .............................. JP2014-260582

(51) Int. Cl.
*F02C 7/32*  (2006.01)
*F02K 3/06*  (2006.01)
(Continued)

(52) U.S. Cl.
CPC ................ *F02C 7/32* (2013.01); *B64C 11/14* (2013.01); *F02C 7/18* (2013.01); *F02C 7/36* (2013.01);
(Continued)

(58) Field of Classification Search
CPC ...... F02C 7/32; F02C 7/36; F02K 3/06; F05D 2260/40311
See application file for complete search history.

(56) References Cited

U.S. PATENT DOCUMENTS 4,704,862 A  11/1987  Dennison et al.
4,722,666 A   2/1988  Dennison et al.
(Continued)

FOREIGN PATENT DOCUMENTS

GB   2 198 791 A    6/1988
GB     2219046 A   11/1989
(Continued)

OTHER PUBLICATIONS

Communication dated Jul. 5, 2018, from the European Patent Office in counterpart European Application No. 15872132.4.
(Continued)

*Primary Examiner* — Thomas P Burke
(74) *Attorney, Agent, or Firm* — Sughrue Mion, PLLC

(57) ABSTRACT

An aircraft engine apparatus (1) includes: a rotating shaft (6); a fan (10) driven by the rotating shaft; a fan case surrounding the fan; aircraft equipment (28) disposed upstream of the fan and, in a radial direction of the rotating shaft, disposed inward of a peripheral edge of the fan case; a casing (2) that accommodates at least part of the rotating shaft and supports the fan case; a first motive force transmitter (9) coupled to the rotating shaft and the fan; a second motive force transmitter (32) disposed inward of the first motive force transmitter in the radial direction of the rotating shaft and coupled to the rotating shaft and the aircraft equipment; and a support member (12) disposed between the first motive force transmitter and the second motive force transmitter, the support member coupling the casing and the aircraft equipment and supporting the aircraft equipment.

8 Claims, 8 Drawing Sheets

(51) Int. Cl.
*F02C 7/36* (2006.01)
*B64C 11/14* (2006.01)
*F02C 7/18* (2006.01)

(52) U.S. Cl.
CPC ............ *F02K 3/06* (2013.01); *F05D 2220/36* (2013.01); *F05D 2260/40311* (2013.01); *Y02T 50/60* (2013.01)

(56) References Cited

U.S. PATENT DOCUMENTS

| | | | |
|---|---|---|---|
| 10,605,165 B2* | 3/2020 | Abe | B64C 11/02 |
| 2002/0154999 A1* | 10/2002 | Eccles | B64D 41/007 |
| | | | 416/95 |
| 2010/0133832 A1* | 6/2010 | Butt | B64C 11/48 |
| | | | 290/46 |
| 2010/0162723 A1* | 7/2010 | Copeland | F02C 7/36 |
| | | | 60/787 |
| 2013/0000317 A1* | 1/2013 | Berryann | F01D 19/00 |
| | | | 60/778 |
| 2013/0111873 A1* | 5/2013 | Balk | B64D 33/02 |
| | | | 60/226.1 |
| 2013/0259638 A1* | 10/2013 | Suciu | F02C 7/047 |
| | | | 415/1 |
| 2014/0038770 A1 | 2/2014 | Goi et al. | |
| 2014/0086737 A1* | 3/2014 | Hyatt | F01D 5/147 |
| | | | 415/208.1 |
| 2015/0337677 A1* | 11/2015 | Roberge | F01D 25/02 |
| | | | 290/52 |
| 2016/0229549 A1* | 8/2016 | Mitrovic | B64C 11/44 |

FOREIGN PATENT DOCUMENTS

| | | |
|---|---|---|
| JP | 61-275550 A | 12/1986 |
| JP | 64-019124 A | 1/1989 |
| JP | 2010-179815 A | 8/2010 |
| WO | 2012/137843 A1 | 10/2012 |

OTHER PUBLICATIONS

Written Opinion of International Searching Authority of PCT/JP2015/005529 dated Jan. 26, 2016.
International Search Report of PCT/JP2015/005529 dated Jan. 26, 2016.
International Search Report of PCT/JP2015/005520 dated Jan. 26, 2016.

* cited by examiner

AIRCRAFT ENGINE POWER GENERATOR DISPOSED INSIDE OF A STATIONARY NOSE CONE

CROSS REFERENCE TO RELATED APPLICATIONS

This application is a National Stage of International Application No. PCT/JP2015/005529 filed Nov. 4, 2015, claiming priority based on Japanese Patent Application No. 2014-260582 filed Dec. 24, 2014, the contents of all of which are incorporated herein by reference in their entirety.

TECHNICAL FIELD

The present invention relates to an aircraft engine apparatus.

BACKGROUND ART

There are cases where an aircraft is provided with aircraft equipment that is driven by the driving force of an aircraft engine. Examples of such aircraft equipment include an aircraft power generator that generates electric power by utilizing the driving force of the aircraft engine and that supplies the generated power to electrical equipment installed in the aircraft. Other examples of the aircraft equipment include pumps used in a hydraulic system or used for fuel supply. For example, as disclosed in Patent Literatures 1 and 2, a power generator that is aircraft equipment is mounted to a fan case of an aircraft engine from the outside. The driving force of a rotating shaft of the aircraft engine is transmitted to an accessory gearbox provided outward of the aircraft engine via a coupling shaft extending in the radial direction of the rotating shaft, and is inputted to the power generator from the accessory gearbox.

CITATION LIST

Patent Literature

PTL 1: WO2012/137843A1
PTL 2: Japanese Laid-Open Patent Application Publication No. 2010-179815

SUMMARY OF INVENTION

Technical Problem

In the above-described configuration, the power generator and the accessory gearbox, which are aircraft equipment, are disposed outward of the fan case. Accordingly, the frontal area of the aircraft engine apparatus (i.e., the area of the aircraft engine apparatus when seen from the upstream side) increases. As a result, the air resistance of the aircraft may increase and cause deterioration in fuel consumption. Moreover, this configuration requires the coupling shaft for transmitting motive force from the rotating shaft to the accessory gearbox, and thus the motive force transmission structure is complex, which causes an increase in the weight of the aircraft engine apparatus.

In view of the above, an object of the present invention is to provide an aircraft engine apparatus that includes aircraft equipment driven by the driving force of an aircraft engine and that is capable of suppressing an increase in the frontal area with a light-weighted and simple configuration.

Solution to Problem

In order to solve the above-described problems, an aircraft engine apparatus according to one aspect of the present invention includes: a rotating shaft; a fan driven by the rotating shaft; a fan case surrounding the fan; aircraft equipment disposed upstream of the fan and, in a radial direction of the rotating shaft, disposed inward of a peripheral edge of the fan case; a casing that accommodates at least part of the rotating shaft and supports the fan case; a first motive force transmitter coupled to the rotating shaft and the fan; a second motive force transmitter disposed inward of the first motive force transmitter in the radial direction of the rotating shaft and coupled to the rotating shaft and the aircraft equipment; and a support member disposed between the first motive force transmitter and the second motive force transmitter, the support member coupling the casing and the aircraft equipment and supporting the aircraft equipment.

According to the above configuration, since the support member supporting the aircraft equipment is disposed between the first motive force transmitter and the second motive force transmitter, the aircraft equipment can be supported and disposed inward of the fan case while allowing motive force to be transmitted from the rotating shaft to the fan and the aircraft equipment. Since the aircraft equipment is disposed inward of the fan case in this manner, the aircraft equipment can be made closer to the rotating shaft than in a case where the aircraft equipment is disposed outward of the fan case. Consequently, the motive force transmission structure for transmitting motive force from the rotating shaft to the aircraft equipment can be made light-weighted and simple. Moreover, aircraft equipment and an accessory gearbox disposed outward of the fan case can be eliminated, and thereby an increase in the frontal area of the aircraft engine apparatus can be suppressed.

Advantageous Effects of Invention

The present invention makes it possible to provide an aircraft engine apparatus that includes aircraft equipment driven by the driving force of an aircraft engine and that is capable of suppressing an increase in the frontal area with a light-weighted and simple configuration.

DESCRIPTION OF EMBODIMENTS

Hereinafter, embodiments of the present invention are described with reference to the drawings. It should be noted that, in the description below, the term "upstream" refers to upstream in the direction of air flowing inside an engine unless otherwise specified. Similarly, the term "downstream" refers to downstream in the direction of air flowing inside the engine unless otherwise specified. That is, the term "upstream side" refers to the side at which a fan is provided in the axial direction of a rotating shaft of the engine, and the "downstream side" refers to the side at which a tail cone is provided in the axial direction of the rotating shaft of the engine. The term "radial direction" or "radially" refers to the radial direction with reference to the axial direction of the rotating shaft of the engine unless otherwise specified. Similarly, the term "circumferential direction" or "circumferentially" refers to the circumferential direction with reference to the axial direction of the rotating shaft of the engine unless otherwise specified.

Embodiment 1

Figure 1:
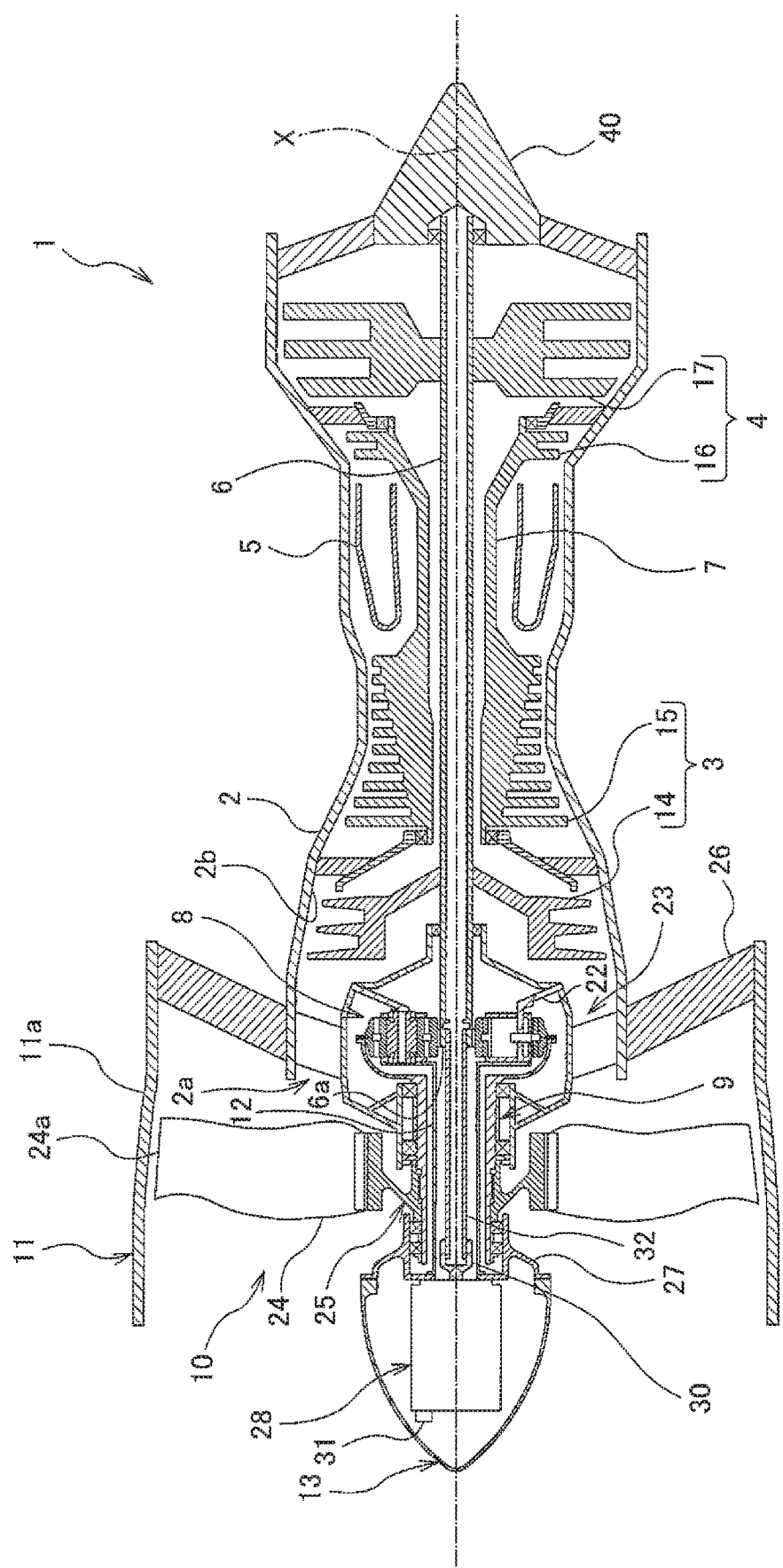
FIG. 1 is a sectional view showing a configuration of an aircraft engine apparatus according to Embodiment 1.
Figure 2:
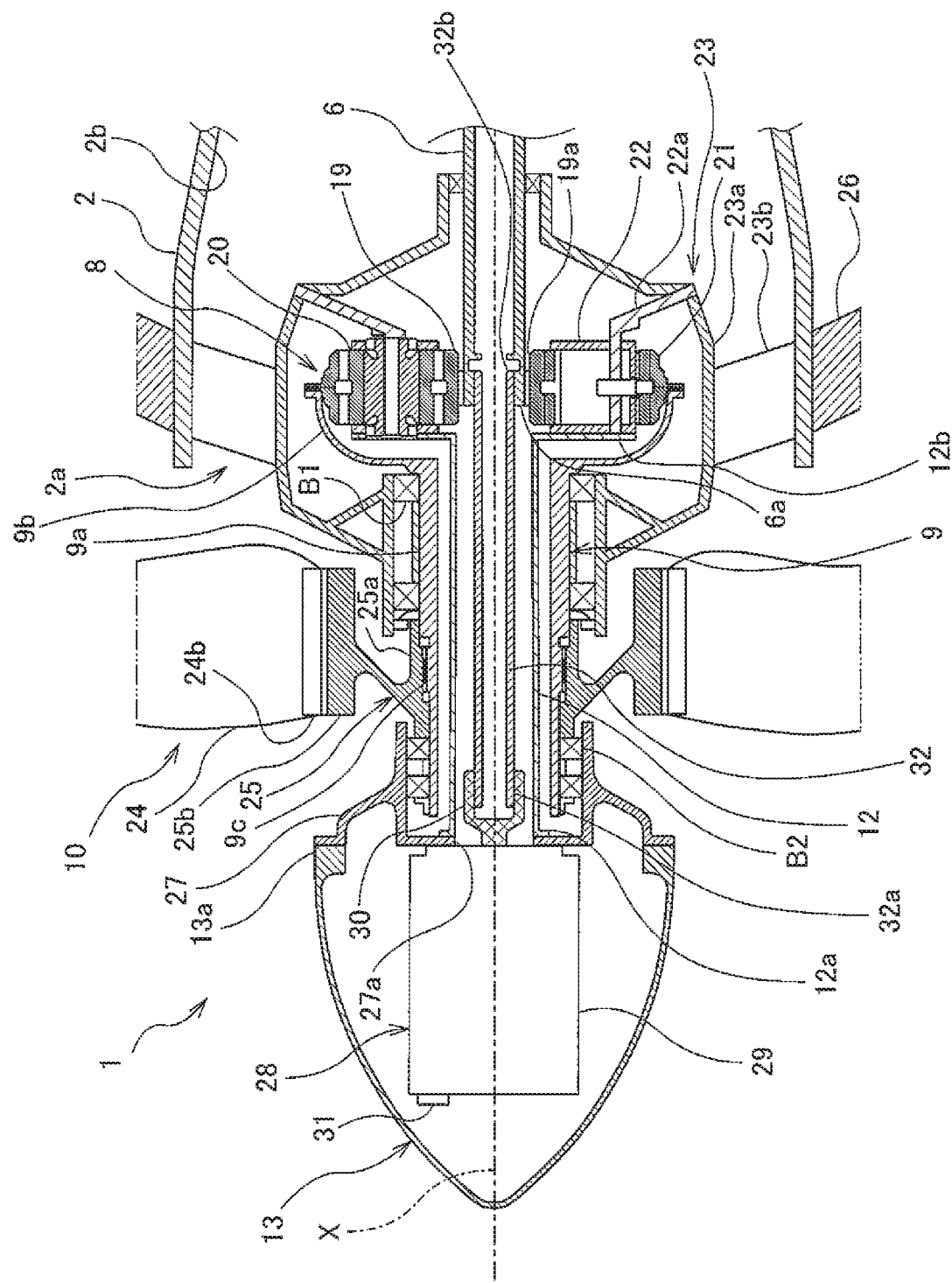
FIG. 2 is a fragmentary sectional view of a fan and its vicinity in the aircraft engine apparatus according to Embodiment 1.

FIG. 1 is a sectional view showing a configuration of an aircraft engine apparatus 1 (which may be hereinafter referred to as an "engine apparatus 1") according to Embodiment 1. FIG. 2 is a fragmentary sectional view of a fan 10 and its vicinity in the engine apparatus 1. As shown in FIG. 1 and FIG. 2, the engine apparatus 1 includes an engine and a power generator 28. As one example, the engine is a biaxial gas turbine engine of a GTF (Geared Turbo Fan) type, and includes a casing 2, a compressor 3, a turbine 4, a combustor 5, a low-pressure shaft 6, a high-pressure shaft 7, a transmission 8, a coupling member 9, the fan 10, a fan case 11, a torque tube 12, a nose cone 13, and a drive shaft 32.

The casing 2 is a cylindrical casing, and extends in the longitudinal direction of the engine apparatus 1. The casing 2 accommodates at least part of the low-pressure shaft 6, and supports the fan case 11. Specifically, the casing 2 accommodates the compressor 3, the turbine 4, the combustor 5, the low-pressure shaft 6, the high-pressure shaft 7, the transmission 8, and the coupling member 9. The compressor 3 is disposed at the upstream side inside the casing 2. The turbine 4 is disposed at the downstream side inside the casing 2. The combustor 5 is disposed between the compressor 3 and the turbine 4. The compressor 3 includes an upstream-side low-pressure compressor 14 and a downstream-side high-pressure compressor 15. The turbine 4 includes an upstream-side high-pressure turbine 16 and a downstream-side low-pressure turbine 17. Each of the high-pressure turbine 16 and the low-pressure turbine 17 is driven to rotate when the engine apparatus 1 is driven. The low-pressure shaft 6 (rotating shaft) extends in the longitudinal direction of the engine apparatus 1, and is pivotally supported around an axis X. The low-pressure compressor 14 and the low-pressure turbine 17 are coupled to the low-pressure shaft 6. The high-pressure shaft 7 (rotating shaft) is pivotally supported around the axis X in a state where the low-pressure shaft 6 is inserted in the high-pressure shaft 7. The high-pressure compressor 15 and the high-pressure turbine 16 are coupled to the high-pressure shaft 7. The combustor 5 is provided between the casing 2 and the high-pressure shaft 7 inside the casing 2.

The inner space of the casing 2 is open to the outside on both sides in its longitudinal direction. Through a passage 2a formed at the upstream side in the engine apparatus 1, outside air is introduced toward the downstream side. A tail cone 40 is provided at the downstream side of the casing 2. The fan case 11 is a cylindrical case whose diameter is greater than that of the casing 2, and is disposed at the upstream side of the casing 2. The fan 10 is accommodated in the inner space of the fan case 11, and the fan case 11 surrounds the fan 10. The driving force of the low-pressure shaft 6 is transmitted to the fan 10. The thrust force of the engine is obtained from: a jet stream of combustion gas jetted out from the combustor 5 to the downstream side passing around the tail cone 40; and a high-speed air stream jetted out from the fan 10 to the downstream side passing around the casing 2.

The transmission 8 is provided between the low-pressure shaft 6 and the coupling member 9, and is disposed downstream of the fan 10 and upstream of the compressor 3. As shown in FIG. 2, the transmission 8 includes: a sun gear 19; a plurality of planetary gears 20 arranged at intervals around the sun gear 19 and meshed with the sun gear 19; a ring gear 21 provided in a manner to surround the outer periphery of each planetary gear 20 and including internal teeth meshed with the planetary gears 20; and a carrier 22 pivotally supporting the planetary gears 20. The transmission 8 herein is a star-type planetary gear mechanism, in which the planetary gears 20 do not revolve. Specifically, as described below, the carrier 22 is coupled to the casing 2, and is fixed at a predetermined position between the sun gear 19 and the ring gear 21. Thus, in the transmission 8, the carrier 22 is configured as an unmovable (stationary) part fixed at the predetermined position. Each of the planetary gears 20 is positioned at a predetermined position in the circumferential direction of the sun gear 19 by the carrier 22, which is the unmovable part of the transmission 8, and is pivotally supported at the predetermined position by the carrier 22. An insertion hole 19a is formed in the central portion of the sun gear 19. The sun gear 19 is coupled to the low-pressure shaft 6 in a state where one end portion 6a of the low-pressure shaft 6 is inserted in the insertion hole 19a. The carrier 22 includes at least one extended portion 22a, which extends in the radial direction toward an inner peripheral surface 2b of the casing 2.

A support structure 23 coupled to the casing 2 is provided inside the casing 2. The support structure 23 includes a body portion 23a and a plurality of supporting arms 23b extending from the body portion 23a. The body portion 23a has a cylindrical shape, and accommodates the transmission 8 therein. Each of the supporting arms 23b extends radially inward from the inner peripheral surface 2b of the casing 2, and is connected to the body portion 23a.

The extended portion 22a of the carrier 22 is coupled to the body portion 23a. In this manner, the carrier 22 is coupled to the casing 2 via the support structure 23. The transmission 8 is used as a FDGS (Fan Drive Gear System) that reduces the rotational speed of the fan 10 to be lower than the rotational speed of the low-pressure shaft 6.

The transmission 8 reduces and transmits part of the rotational driving force of the low-pressure shaft 6 to the fan 10. The coupling member 9, which is a cylindrical hollow member extending in the direction of the axis X, is coupled to the ring gear 21 of the transmission 8, and the coupling member 9 is also coupled to the fan 10. The coupling member 9 is used as a first motive force transmitter, which is coupled to the low-pressure shaft 6 and the fan 10 and which transmits part of the driving force of the low-pressure shaft 6 to the fan 10. Specifically, the coupling member 9 is coupled to the low-pressure shaft 6 via the transmission 8. The coupling member 9 includes: a tubular body portion 9a extending in the direction of the axis X of the low-pressure shaft 6; and an expanded diameter portion 9b provided on one end of the body portion 9a, the one end being adjacent to the transmission 8. The expanded diameter portion 9b is coupled to the ring gear 21 while covering part of the outer periphery of the ring gear 21. A bearing B1 is provided between the support structure 23 and the outer peripheral surface of the body portion 9a of the coupling member 9. Accordingly, the coupling member 9 is supported by the support structure 23, such that the coupling member 9 is rotatable around the axis X.

The power generator 28 is disposed upstream of the fan 10 and radially inward of the peripheral edge of the fan case 11. The power generator 28 is aircraft equipment driven by the driving force of the engine. Also, the power generator 28 is an IDG (Integrated Drive Generator: a power generator integrated with a drive mechanism), which generates electric power with a constant frequency regardless of the rotational speed of the engine. The power generator 28 is used for supplying stable electric power to external equipment outside the engine. The power generator 28 includes: a bottomed cylindrical housing 29; a generator input shaft 30, which protrudes from the housing 29 and serves as an input shaft to which external driving force is inputted; a variator (not shown) accommodated in the housing 29; and a power generating unit accommodated in the housing 29 and driven by an output from the variator. The power generator 28 adjusts the speed ratio of the variator in accordance with the rotational speed of the generator input shaft 30, and an output from the variator is inputted to the power generating unit as driving force of a constant rotational speed. As a result, the power generating unit generates AC power with a constant frequency. The AC power is supplied to the external equipment via a terminal 31.

The drive shaft 32, which transmits the driving force of the low-pressure shaft 6 to the generator input shaft 30 of the power generator 28, is provided radially inward of the coupling member 9 (the first motive force transmitter). The drive shaft 32 is used as a second motive force transmitter, which transmits part of the driving force of the low-pressure shaft 6 to the power generator 28. One end portion 32a of the drive shaft 32 is coupled to the generator input shaft 30 of the power generator 28 by spline coupling, and the other end portion 32b of the drive shaft 32 is inserted in the one end portion 6a of the low-pressure shaft 6 and coupled thereto by spline coupling. The one end portion 6a of the low-pressure shaft 6 is inserted in the sun gear 19 of the transmission 8 and coupled thereto. Part of the driving force of the low-pressure shaft 6 is transmitted to the generator input shaft 30 via the drive shaft 32, and the power generator 28 generates electric power by being driven at the same rotational speed as the rotational speed of the low-pressure shaft 6. Part of the driving force of the low-pressure shaft 6 is inputted to the generator input shaft 30 with a simple structure using the drive shaft 32, and thereby resistance in the motive force transmission is reduced and the reliability thereof is improved.

The fan 10 includes: a fan hub 25; and a plurality of fan blades 24, which are coupled to the fan hub 25 such that they are arranged at intervals in the circumferential direction and extend in a radial manner. A distal end portion 24a of each of the fan blades 24 is covered by the annular fan case 11 (see FIG. 1). The fan case 11 is supported by the casing 2 via a plurality of fixing vanes 26. An outer peripheral surface 11a of the fan case 11 is supported by a nacelle (not shown) extending in the longitudinal direction of the engine apparatus 1. Part of outside air fed from the fan 10 passes through an air passage formed between the casing 2 and the nacelle from the upstream side toward the downstream side of the engine apparatus 1.

The fan hub 25 includes a cylindrical base portion 25a and a plurality of joint portions 25b provided around the base portion 25a. The fan hub 25 is coupled to a groove 9c formed in the peripheral surface of the body portion 9a by spline coupling in a state where the body portion 9a of the coupling member 9 is inserted in the base portion 25a. Accordingly, the fan 10 is coupled to the coupling member 9 and driven by the low-pressure shaft 6. A proximal end portion 24b of each of the fan blades 24 is coupled to a corresponding one of the joint portions 25b. It should be noted that the fan blades 24 and the fan hub 25 may be integrally formed.

A sleeve 27, which is an annular support member, is fitted to one end portion of the coupling member 9 via a bearing B2, the one end portion 27a being adjacent to the fan 10. The power generator 28 is fixed to the sleeve 27. The power generator 28 is supported by the coupling member 9 via the sleeve 27 and the bearing B2, such that the power generator 28 is rotatable relative to the coupling member 9. In this manner, the power generator 28 is supported by the coupling member 9 in the radial direction. That is, the sleeve 27 positions and restricts the power generator 28 in the radial direction.

The torque tube 12, which is a hollow support member supporting the power generator 28, is disposed between the coupling member 9 and the drive shaft 32. The torque tube 12 extends in the direction of the axis X inside the body portion 9a of the coupling member 9. One end portion 12a of the torque tube 12 is coupled to the power generator 28, and the other end portion 12b of the torque tube 12 is coupled to the carrier 22, which is the unmovable part of the transmission 8. That is, the torque tube 12 is coupled to the casing 2 via the carrier 22. The torque tube 12 positions and restricts the power generator 28 in the rotation direction. That is, the torque tube 12 prevents the housing 29 of the power generator 28 from rotating in accordance with the rotation of the fan 10 or of the drive shaft 32.

The torque tube 12 is disposed radially inward of the coupling member 9, and the drive shaft 32 is disposed radially inward of the torque tube 12. In this manner, in the engine apparatus 1, a motive force transmitting path extending from the low-pressure shaft 6 to the fan 10, the torque tube 12 supporting the power generator 28, and a motive force transmitting path extending from the low-pressure shaft 6 to the power generator 28 are arranged in this order from the outer side to the inner side in the radial direction of the low-pressure shaft 6.

The power generator 28 is covered by the substantially conoid nose cone 13 and thus protected from the outside. Similar to the power generator 28, the nose cone 13 is disposed upstream of the fan 10, and is fixed to the sleeve 27 at a peripheral edge portion 13a. It should be noted that, in the present embodiment, since the power generator 28 is coupled to the sleeve 27, the torque tube 12 also positions and restricts both the sleeve 27 and the nose cone 13 in the rotation direction. Wiring connected to the terminal 31 is, for example, extended along the outer periphery of the torque tube 12 through an insertion hole (not shown) formed in the sleeve 27. The wiring is further extended along the support structure 23 and the fixing vanes 26, and thereby taken out of the engine apparatus 1. In this manner, the wiring can be installed so that the wiring will not hinder the rotation of the ring gear 21, the coupling member 9, and the fan 10 and the rotation of the generator input shaft 30 and the drive shaft 32.

Unlike a case where the power generator 28 is disposed downstream of the fan 10, such as in an air passage, hindrance to the flow of air in the engine apparatus 1 by the power generator 28 can be prevented by disposing the power generator 28 upstream of the fan 10.

Since the torque tube 12 supporting the power generator 28 is disposed between the coupling member 9 and the drive shaft 32, the power generator 28 can be supported and disposed inward of the fan case 11 while allowing motive force to be transmitted from the low-pressure shaft 6 to the fan 10 and the power generator 28. Since the power generator 28 is disposed inward of the fan case 11 in this manner, the power generator 28 can be made closer to the low-pressure shaft 6 than in a case where the power generator 28 is disposed outward of the fan case 11. Consequently, the motive force transmission structure for transmitting motive force from the low-pressure shaft 6 to the power generator 28 can be made light-weighted and simple. Specifically, assume a case where the power generator 28 is disposed outside the fan case 11 and the driving force of the low-pressure shaft 6 is to be taken out. In this case, it is considered that, for example, components including a coupling shaft extending radially outward from the low-pressure shaft 6 and an accessory gearbox for coupling the coupling shaft to the power generator 28 would be necessary. On the other hand, according to the present embodiment, such components including the coupling shaft and the accessory gearbox can be eliminated.

Moreover, since the power generator 28 and the accessory gearbox are not disposed outward of the fan case 11, an increase in the frontal area of the engine apparatus 1 can be suppressed. This makes it possible to prevent deterioration in fuel consumption due to an increase in the air resistance of the aircraft.

Furthermore, the power generator 28 is spaced apart, toward the upstream side, from a section where the turbine 4 and the combustor 5, the temperatures of which become high when the engine apparatus 1 is driven, are disposed (i.e., spaced apart from the hot section of the engine). Therefore, heat generated when the engine is driven hardly reaches the power generator 28. This makes it possible to drive the power generator 28 in a thermally stable manner.

Embodiment 2

Figure 3:
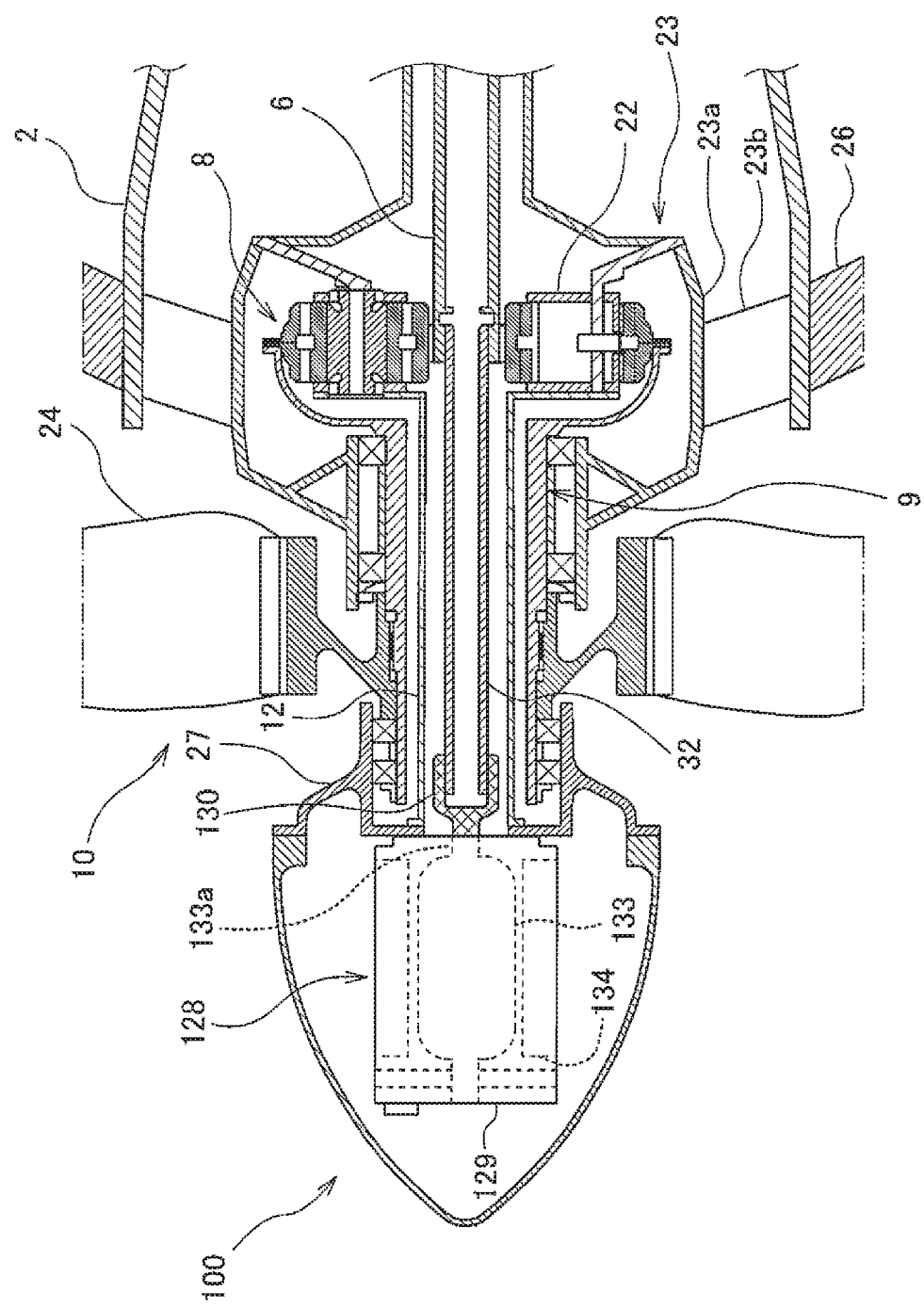
FIG. 3 is a fragmentary sectional view of a fan and its vicinity in an aircraft engine apparatus according to Embodiment 2.

FIG. 3 is a fragmentary sectional view of the fan 10 and its vicinity in an engine apparatus 100 according to Embodiment 2. FIG. 3 shows, by dashed line, part of an internal structure of a power generator 128. The power generator 128 is a generator that includes: a rotor 133 pivotally supported inside a housing 129; and a stator 134 provided in a manner to surround the rotor 133. A shaft 133a of the rotor 133 is coupled to a generator input shaft 130.

Embodiment 3

Figure 4:
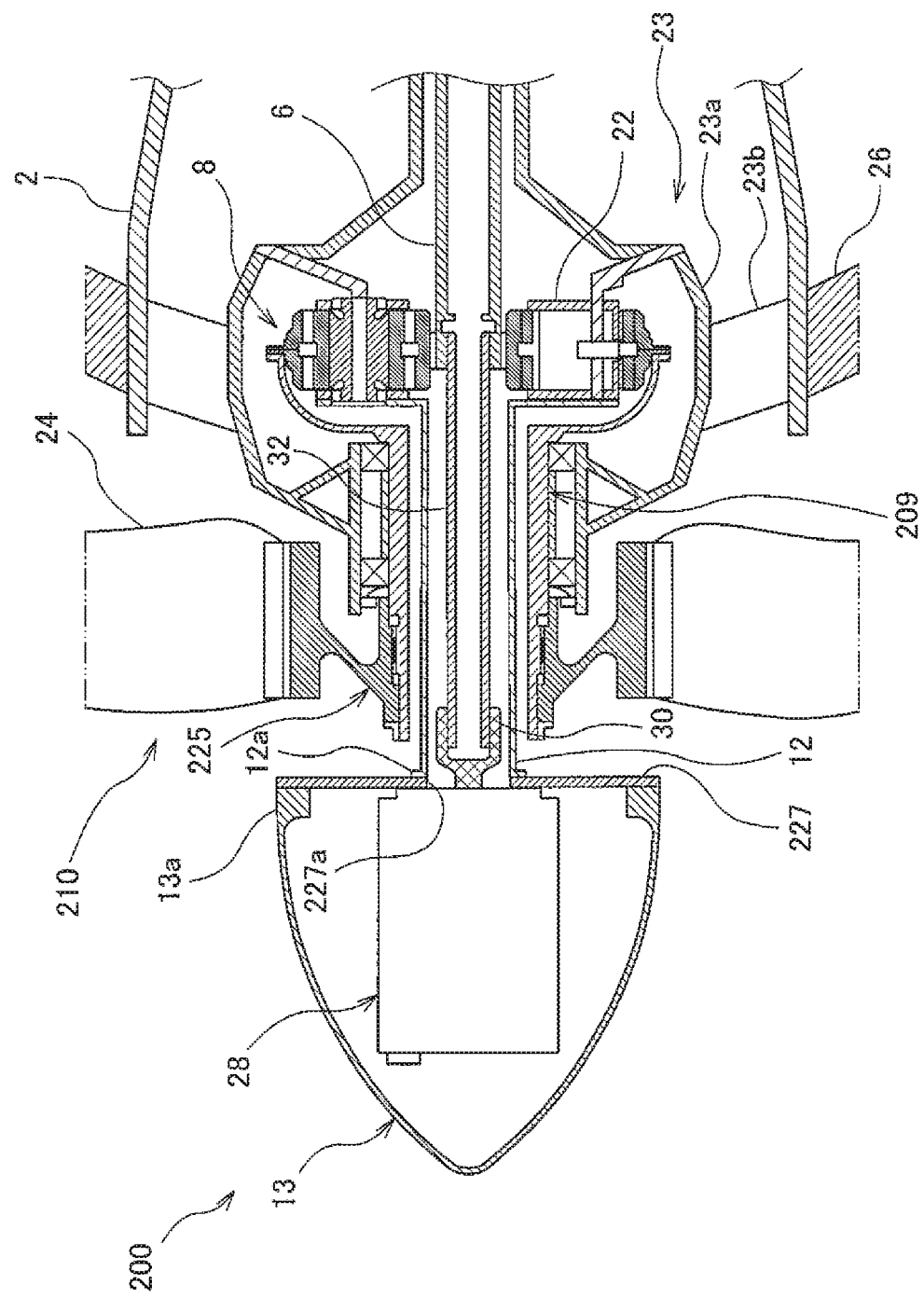
FIG. 4 is a fragmentary sectional view of a fan and its vicinity in an aircraft engine apparatus according to Embodiment 3.

FIG. 4 is a fragmentary sectional view of the fan 210 and fan hub 225 in their vicinity in an engine apparatus 200 according to Embodiment 3. In Embodiment 3, the power generator 28 is fixed to a plate-shaped fixing member 227. An opening 227a is formed in the central portion of the fixing member 227. The generator input shaft 30 of the power generator 28 is inserted in the opening 227a. The nose cone 13 is supported by the fixing member 227 in a manner to cover the power generator 28. The generator input shaft 30 is coupled to the drive shaft 32 inside the torque tube 12. The fixing member 227 is spaced apart from a coupling member 209. The fixing member 227 is mainly supported by the torque tube 12 coupled to the carrier 22.

In Embodiment 3, since the fixing member 227 is spaced apart from the coupling member 209, the load of the power generator 28 and the fixing member 227 is hardly applied to the coupling member 209. This makes it possible to simplify the structure of the coupling member 209.

Embodiment 4

Figure 5:
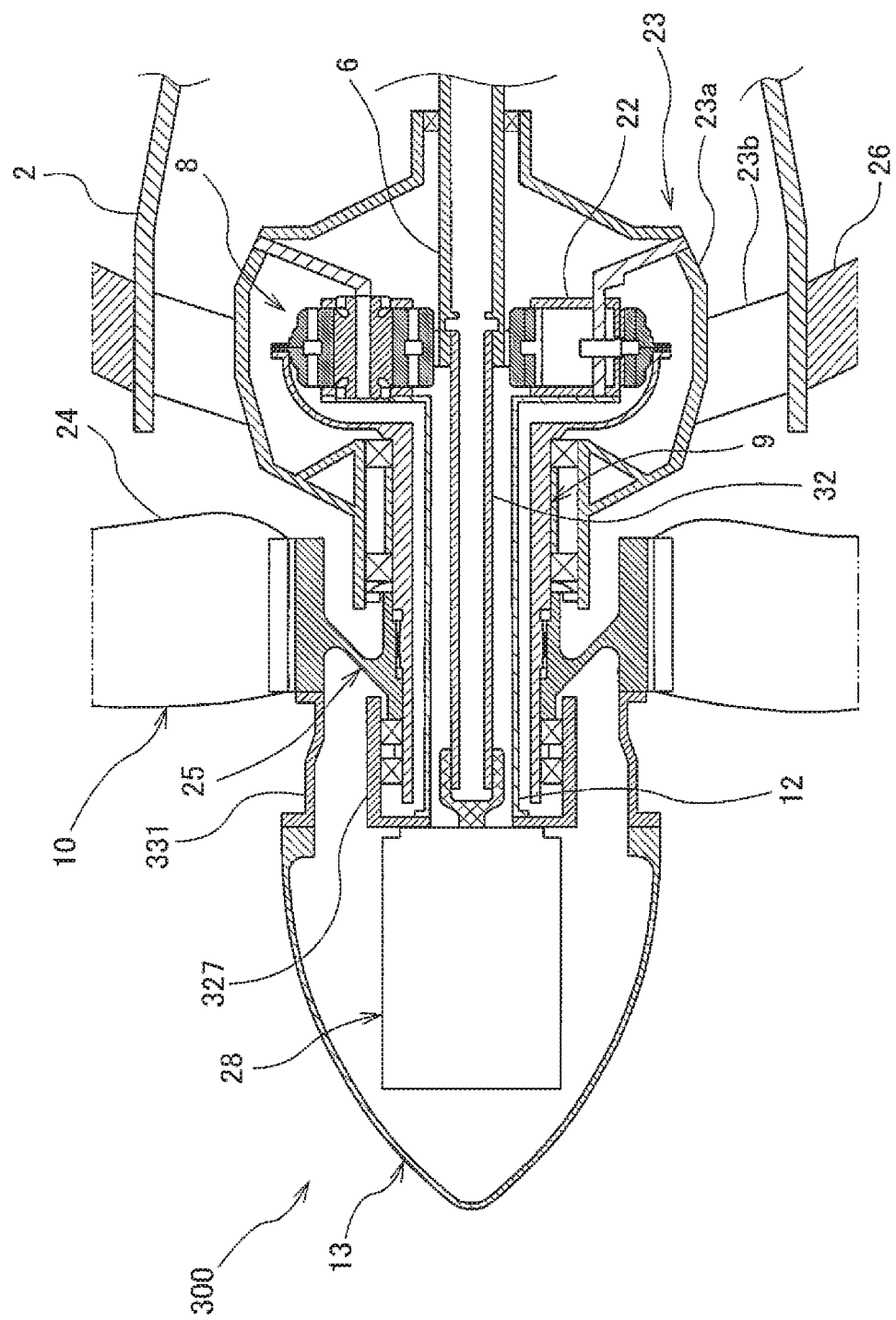
FIG. 5 is a fragmentary sectional view of a fan and its vicinity in an aircraft engine apparatus according to Embodiment 4.

FIG. 5 is a fragmentary sectional view of the fan 10 and its vicinity in an engine apparatus 300 according to Embodiment 4. In Embodiment 4, a sleeve 327, to which the power generator 28 is mounted, is supported by the coupling member 9 via the bearing B2. The nose cone 13 is coupled to the fan hub 25 in such a manner as not to contact the sleeve 327 by using an annular member 331, which is formed to have substantially the same external diameter as the external diameter of the peripheral edge portion 13a. Accordingly, the nose cone 13 rotates together with the fan hub 25. The power generator 28 is accommodated inside the nose cone 13 in such a manner as not to contact the nose cone 13.

It should be noted that a plurality of fins may be provided on the inner peripheral surface of the nose cone 13, the inner peripheral surface facing the power generator 28, and while the nose cone 13 is rotating, a flow of air may be generated inside the nose cone 13 and the air may be fed by the fins to the power generator 28. In this manner, a configuration capable of air-cooling the power generator 28 can be realized.

Embodiment 5

Figure 6:
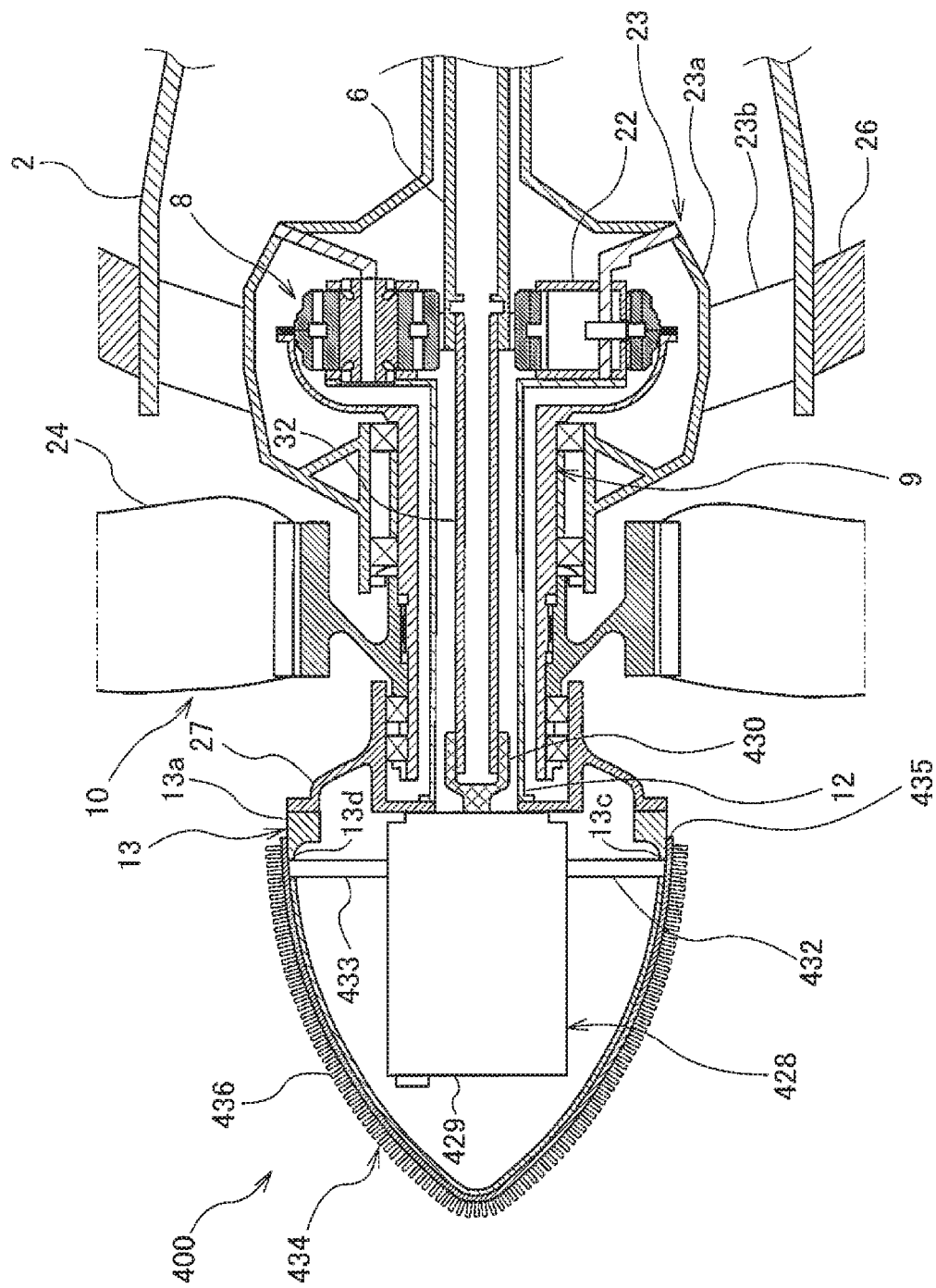
FIG. 6 is a fragmentary sectional view of a fan and its vicinity in an aircraft engine apparatus according to Embodiment 5.

FIG. 6 is a fragmentary sectional view of the fan 10 and its vicinity in an engine apparatus 400 according to Embodiment 5. In a power generator 428, a predetermined cooling fluid (e.g., part of oil flowing inside a housing 429) is circulated inside the housing 429 so that each component in the housing 429 can be cooled down by heat exchange. Provided outside the power generator 428 are: piping 432 for discharging the cooling fluid that has been used to exchange heat with each component in the housing 429 to the outside; and piping 433 for introducing the cooling fluid that has been cooled down into the power generator 428. The piping 432 and the piping 433 are inserted in an insertion hole 13c and an insertion hole 13d, respectively, which are formed in the nose cone 13. The piping 432 and the piping 433 are coupled to a heat exchanger 434 provided along the outer surface of the nose cone 13.

As one example, the heat exchanger 434 is of a surface type and includes a body 435 and a plurality of radiation fins 436. The body 435 is a thin box-type casing, and includes a plate (not shown) therein, on which corrugated fins are formed. The corrugated fins form a plurality of channels, which are configured such that the cooling fluid is allowed to flow between the channels. The plurality of radiation fins 436 are thermal-coupled to the body 435 in a state where the fins 436 are provided upright on the outer surface of the body 435.

In Embodiment 5, the cooling fluid that has been used to cool down the power generator 428 is fed to the body 435 of the heat exchanger 434 through the piping 432. While the engine apparatus 400 is being driven, a large amount of outside air comes into contact with the radiation fins 436 of the heat exchanger 434. This allows the cooling fluid flowing inside the body 435 to exchange heat well with the outside air, and as a result, the cooling fluid is cooled down. The cooling fluid also exchanges heat with the nose cone 13 via the body 435, and is thereby cooled down. Accordingly, the cooling fluid that has been sufficiently cooled down can be returned into the housing 429 through the piping 433, and reused for the heat exchange with each component in the housing 429. Thus, when the power generator 428 performs electric power generation, the power generator 428 can be favorably cooled down by the cooling fluid. Therefore, improvement in power generation efficiency can be expected. Moreover, since the nose cone 13 is provided with the heat exchanger 434, the piping 432 and 433 of the cooling fluid for cooling down the power generator 428 can be shortened. This makes it possible to suppress weight increase due to the installation of the heat exchanger 434 and the piping 432 and 433 to some extent.

Embodiment 6

Figure 7:
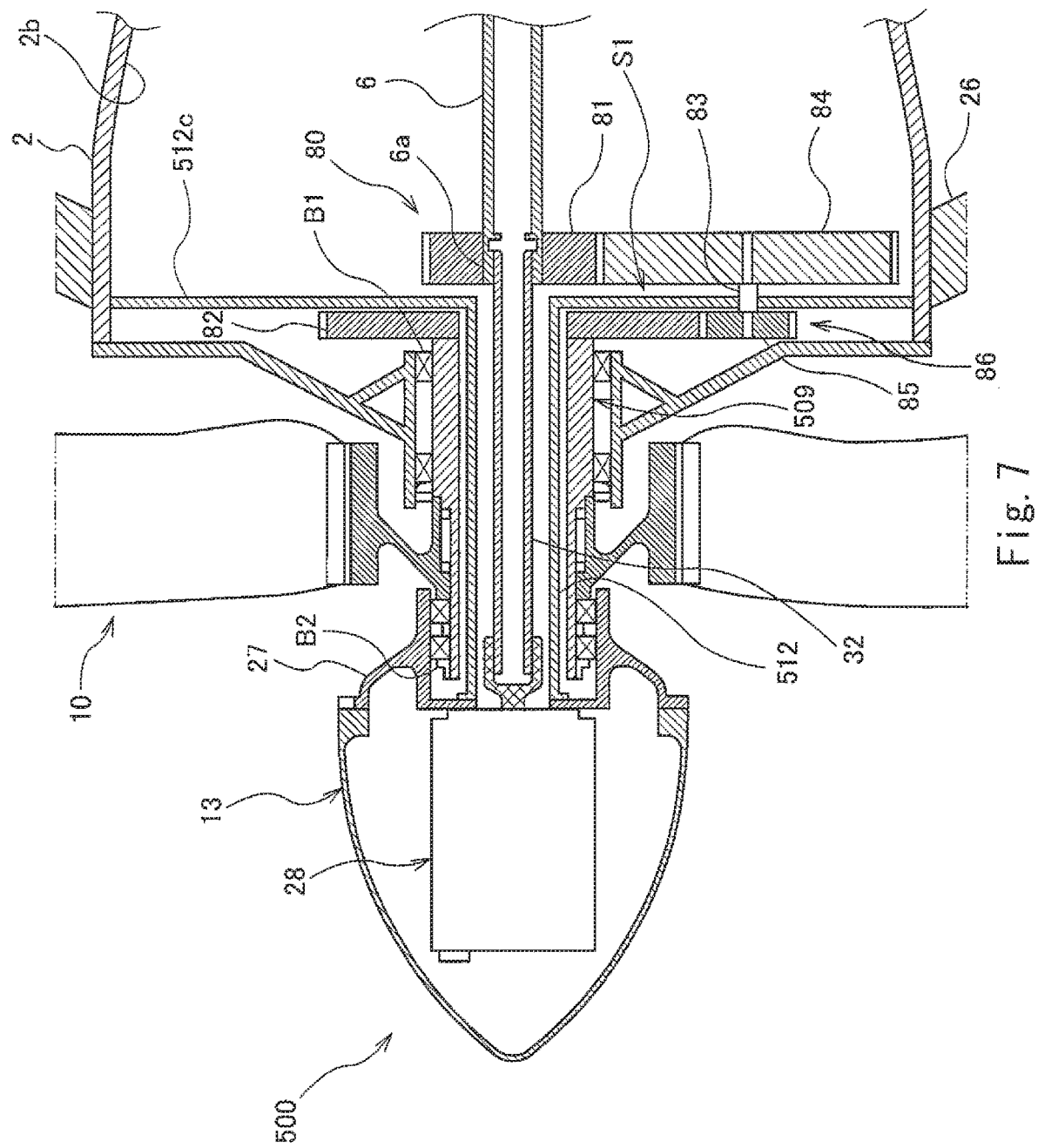
FIG. 7 is a fragmentary sectional view of a fan and its vicinity in an aircraft engine apparatus according to Embodiment 6.

FIG. 7 is a fragmentary sectional view of the fan 10 and its vicinity in an engine apparatus 500 according to Embodiment 6. As shown in FIG. 7, a transmission 80 provided in the engine apparatus 500 includes a first gear 81, a second gear 82, a third gear 84, and a fourth gear 85.

Specifically, in the transmission 80, the first gear 81 is provided on the one end portion 6a of the low-pressure shaft 6, and the second gear 82 is provided on one end of a coupling member 509. The first gear 81 rotates integrally with the low-pressure shaft 6. The second gear 82 rotates integrally with the coupling member 509. As one example, the second gear 82 has a greater external diameter than that of the first gear 81, and includes a larger number of teeth than that of the first gear 81. A gear shaft 86, which is formed such that the third gear 84 is provided on one end of a shaft 83 and the fourth gear 85 is provided on the other end of the shaft 83, is pivotally supported by the transmission 80. The third gear 84 is meshed with the first gear 81. The fourth gear 85 is meshed with the second gear 82. As one example, the third gear 84 has a greater external diameter than that of the fourth gear 85, and includes a larger number of teeth than that of the fourth gear 85.

The transmission 80 includes an inner space S1, which is formed between the first gear 81 and the second gear 82, such that the inner space S1 extends in the axial direction of the low-pressure shaft 6. A torque tube 512 extends toward the inner peripheral surface 2b of the casing 2 through the inner space S1. An end portion 512c of the torque tube 512 is coupled to the casing 2. Accordingly, the nose cone 13, the sleeve 27, and the power generator 28 are supported by the torque tube 512 without being affected by the motive force transmitting paths that transmit the rotational driving force of the low-pressure shaft 6 to the fan 10 and the power generator 28. The power generator 28 is coupled to the casing 2 via the sleeve 27 and the torque tube 512. In Embodiment 6, the torque tube 512 is directly coupled to the casing 2, and is thereby used as a support member supporting the power generator 28.

In the transmission 80, the number of teeth and the external diameter may be suitably set for each of the first gear 81, the second gear 82, the third gear 84, and the fourth gear 85. With such settings, for example, while reducing the rotational speed of the fan 10 to be lower than the rotational speed of the low-pressure shaft 6, part of the rotational driving force of the low-pressure shaft 6 can be transferred to the fan 10 to drive the fan 10 to rotate. In addition, for example, while keeping the rotational speed of the generator input shaft 30 to be equal to the rotational speed of the low-pressure shaft 6, part of the rotational driving force of the low-pressure shaft 6 can be inputted to the generator input shaft 30, and thereby electric power can be generated efficiently by the power generator 28.

Embodiment 7

Figure 8:
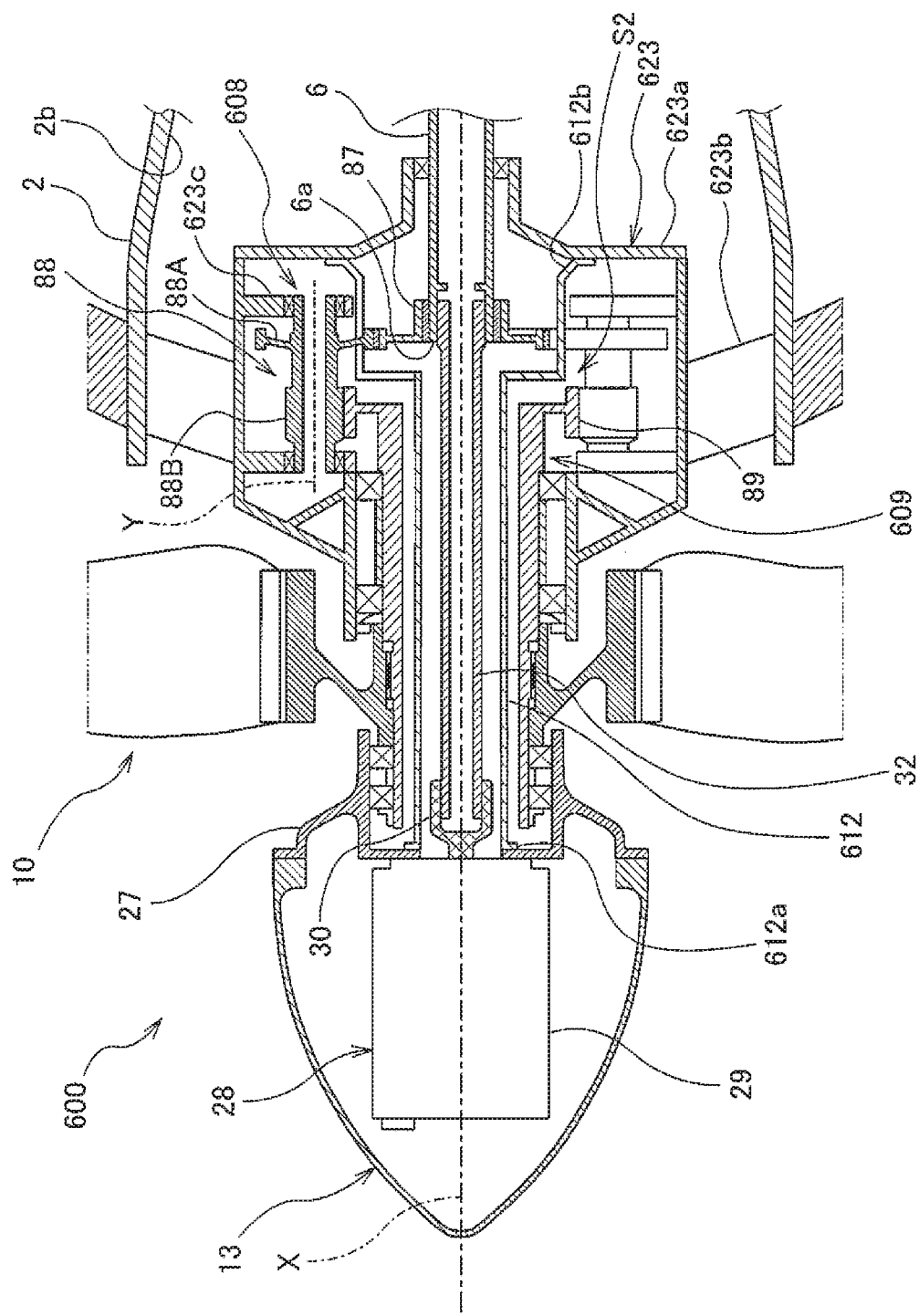
FIG. 8 is a fragmentary sectional view of a fan and its vicinity in an aircraft engine apparatus according to Embodiment 7.

FIG. 8 is a fragmentary sectional view of the fan 10 and its vicinity in an engine apparatus 600 according to Embodiment 7. As shown in FIG. 8, a transmission 608 provided in the engine apparatus 600 includes an input gear 87, a plurality of (five as one example) two-stage gears 88, and an output gear 89. The transmission 608 is accommodated in a cylindrical body portion 623a of a support structure 623.

The input gear 87 is provided on the one end portion 6a of the low-pressure shaft 6, and transmits the rotational driving force of the low-pressure shaft 6 to each of the two-stage gears 88. Each of the plurality of two-stage gears 88 includes a first gear 88A and a second gear 88B. The first gear 88A is meshed with the input gear 87. The second gear 88B is meshed with the output gear 89. The number of teeth of the first gear 88A is different from that of the second gear 88B. As one example, the number of teeth of the first gear 88A is set to be larger than the number of teeth of the second gear 88B. The two-stage gears 88 are arranged to be spaced apart from one another in the circumferential direction of the low-pressure shaft 6 in a state where a rotational axis Y of each two-stage gear 88 is parallel to the axial direction of the generator input shaft 30. Each of the two-stage gears 88 is pivotally supported by a carrier 623c, which is provided inside the body portion 623a of the support structure 623. The output gear 89 is provided integrally with a coupling member 609 and positioned on the other end side of the coupling member 609. The output gear 89 transmits the rotational driving force of each of the two-stage gears 88 to the fan 10 via the coupling member 609. Thus, in the engine apparatus 600, part of the rotational driving force of the low-pressure shaft 6 is transmitted to the fan 10 via the input gear 87, the two-stage gears 88, the output gear 89, and the coupling member 609 sequentially.

The transmission 608 includes a space S2, through which a torque tube 612 passes from the upstream side to the downstream side. Specifically, the torque tube 612 extends from the inner space of the cylindrical coupling member 609, which extends in the direction of the axis X, to the downstream side of the input gear 87 through gaps between adjacent two-stage gears 88 (i.e., through the space S2). In this manner, one end portion 612a of the torque tube 612 is coupled to the power generator 28, and the other end portion 612b of the torque tube 612 is coupled to the body portion 623a of the support structure 623. The support structure 623 is supported by the inner peripheral surface 2b of the casing 2 via supporting arms 623b. In this manner, the power generator 28 is coupled to the casing 2 via the sleeve 27, the torque tube 612, and the support structure 623. Thus, in Embodiment 7, the torque tube 12 and the support structure 623 couple the casing 2 and the power generator 28 together, and are used as support members supporting the power generator 28. In Embodiment 7, the number of two-stage gears 88 is not limited, so long as the number of two-stage gears 88 is one or more.

(Other Matters)

It should be noted that the present invention is not limited to the above-described embodiments, and various modifications, additions, or deletions can be made to the embodiments without departing from the spirit of the present invention. The above-described embodiments may be combined with each other in any manner. For example, part of a configuration or method described in one embodiment may be applied to another embodiment.

In each of the above-described embodiments, a power generator is exemplified as aircraft equipment. However, the aircraft equipment may be any equipment, so long as it is driven by the driving force of the engine. For example, the aircraft equipment may be a pump.

Each of the above-described embodiments describes, as one example, a configuration in which the coupling member and the low-pressure shaft are coupled via the transmission. However, the transmission is not essential. As an alternative, the transmission may be eliminated, and the coupling member and the low-pressure shaft may be directly coupled together. As another alternative, in each of the above-described embodiments, the torque tube may be indirectly coupled to the casing via the transmission by coupling the torque tube to the transmission that is coupled to the casing. As yet another alternative, the torque tube may be directly coupled to the casing without via the transmission.

In the above-described embodiments, for example, a bearing may be provided inside the torque tube 12 or 512, and the drive shaft 32 may be pivotally supported by the bearing. This makes it possible to pivotally support the drive shaft 32 by the torque tube 12 or 512 via the bearing in a stable manner. This also makes it possible to reinforce the torque tube 12 or 512 by utilizing the rigidity of the drive shaft 32. The coupling member 9, 209, or 509 may be pivotally supported by a different bearing, for example, one provided on the outer periphery of the torque tube 12 or 512. This makes it possible to pivotally support the coupling member 9, 209, or 509 via the bearing in a stable manner.

In the above-described Embodiments 1 to 5, the low-pressure shaft 6 is configured to be coupled to the sun gear 19. However, the configuration of the low-pressure shaft 6 is not thus limited. As an alternative, the low-pressure shaft 6 and the drive shaft 32 may have substantially the same diameter, and both the drive shaft 32 and the low-pressure shaft 6 may be coupled to the sun gear 19. As another alternative, the one end portion 6a of the low-pressure shaft 6 may be inserted in the other end portion 32b of the drive shaft 32 and coupled thereto by spline coupling. In this case, the drive shaft 32 is coupled to the sun gear 19.

The sun gear 19, the planetary gears 20, and the ring gear 21 used in the transmission 8 of the above-described Embodiments 1 to 5 are not limited to helical gears, but may be, for example, double helical gears or spur gears.

The transmission in each of the above-described embodiments may be configured by using a continuously variable transmission. For example, the continuously variable transmission may be a belt-driven continuously variable transmission including a plurality of pulleys and a belt that transmits motive force between the plurality of pulleys. In this case, the torque tube may be provided such that the torque tube passes through a space formed between the plurality of pulleys.

The heat exchanger 434 and the piping 432 and 433 in Embodiment 5 are applicable to an engine apparatus that has such a configuration that the housing of the power generator and the nose cone do not move relative to each other. Accordingly, the heat exchanger 434 and the piping 432 and 433 described in Embodiment 5 can be combined with, for example, any of the following: the engine apparatus 100 of Embodiment 2, the engine apparatus 200 of Embodiment 3, the engine apparatus 500 of Embodiment 6, and the engine apparatus 600 of Embodiment 7.

REFERENCE SIGNS LIST

S1 inner space
S2 space
1, 100 to 600 aircraft engine apparatus
2 casing
6 low-pressure shaft (rotating shaft)
8, 80, 608 transmission
9, 209, 509, 609 coupling member (first motive force transmitter)
10, 110 fan
11 fan case
12, 512, 612 torque tube (support member)
13 nose cone
14 low-pressure turbine
19 sun gear
20 planetary gear
21 ring gear
22 carrier
23, 623 support structure (support member)
28, 128, 428 power generator (aircraft equipment)
30, 130, 430 generator input shaft (input shaft)
32 drive shaft
434 heat exchanger

The invention claimed is:

1. An aircraft engine apparatus comprising:
a rotating shaft;
aircraft equipment disposed upstream of a fan and, in a radial direction of the rotating shaft, disposed inward of a peripheral edge of a fan case;
a casing that accommodates at least part of the rotating shaft and supports the fan case;
a first motive force transmitter coupled to the rotating shaft and the fan;
a second motive force transmitter disposed inward of the first motive force transmitter in the radial direction of the rotating shaft and coupled to the rotating shaft and the aircraft equipment;
a support member disposed between the first motive force transmitter and the second motive force transmitter, the support member coupling the casing and the aircraft equipment and supporting the aircraft equipment;
a nose cone disposed upstream of the fan and configured to be stationary during operation of the aircraft engine apparatus;
a sleeve coupled to a rear end of the nose cone;
a bearing disposed between the sleeve and the first motive force transmitter in the radial direction of the rotating shaft; and
a transmission disposed between the rotating shaft and the first motive force transmitter in the radial direction of the rotating shaft, wherein
the aircraft equipment is a power generator disposed inside the nose cone,
the rotating shaft includes a low-pressure shaft,
the first motive force transmitter includes a cylindrical body portion and a space formed inside the cylindrical body portion, the space extending in an axial direction of the low-pressure shaft,
the power generator includes a generator input shaft to which external driving force is inputted, and generates electric power as a result of the generator input shaft being driven at a rotational speed that is a same rotational speed as a rotational speed of the low-pressure shaft in a state where the generator input shaft is coupled to the low-pressure shaft through the space of the first motive force transmitter, the power generator is supported by the cylindrical body portion via the sleeve and the bearing in such a manner that the power generator is rotatable relative to the cylindrical body portion, so that the power generator is supported by the cylindrical body portion in the radial direction of the rotating shaft, and in a state where the support member penetrates the space in the axial direction, an upstream end portion of the support member in the axial direction is coupled to the power generator, and a downstream end portion of the support member in the axial direction is coupled to the casing via the transmission, so that the power generator is supported by the casing.

2. The aircraft engine apparatus according to claim 1, wherein
the first motive force transmitter is a hollow member that is coupled to the rotating shaft via the transmission and that extends in an axial direction of the rotating shaft.

3. The aircraft engine apparatus according to claim 1, wherein
the transmission includes an unmovable part fixed to the casing, and
the support member is coupled to the casing via the unmovable part.

4. The aircraft engine apparatus according to claim 3, wherein
the transmission is a star-type planetary gear mechanism including:

a sun gear;
a plurality of planetary gears meshed with the sun gear;
a ring gear meshed with the plurality of planetary gears; and
a carrier that supports the plurality of planetary gears, such that the plurality of planetary gears are rotatable, and
the unmovable part is the carrier.

5. The aircraft engine apparatus according to claim 1, wherein
the transmission includes a space, through which the support member passes in the radial direction of the rotating shaft at a position inward of an outer periphery of the transmission, and
the support member passing through the space of the transmission is coupled to the casing.

6. The aircraft engine apparatus according to claim 1, wherein
the second motive force transmitter is a shaft member extending in an axial direction of the rotating shaft.

7. The aircraft engine apparatus according to claim 1, wherein
the generator input shaft and the low-pressure shaft are arranged side by side in an axial direction of the rotating shaft, and are covered by the support member in the radial direction of the rotating shaft.

8. The aircraft engine apparatus according to claim 1, wherein
a heat exchanger is provided on a surface of the nose cone, the heat exchanger exchanging heat generated by the aircraft equipment with outside air.

* * * * *